United States Patent [19]
Jaaskelainen, Jr.

[11] Patent Number: 5,835,088
[45] Date of Patent: Nov. 10, 1998

[54] METHOD AND APPARATUS FOR PROVIDING PROGRAMMABLE WINDOW-TO-WINDOW FOCUS CHANGE WITHIN A DATA PROCESSING SYSTEM USING A GRAPHICAL USER INTERFACE

[75] Inventor: William Jaaskelainen, Jr., Austin, Tex.

[73] Assignee: International Business Machines Corporation, Armonk, N.Y.

[21] Appl. No.: 941,752

[22] Filed: Sep. 30, 1997

Related U.S. Application Data

[63] Continuation of Ser. No. 571,320, Dec. 12, 1995, abandoned.

[51] Int. Cl.$^6$ ..................................................... G06F 3/14
[52] U.S. Cl. ........................................... 345/343; 345/340
[58] Field of Search ..................................... 345/326, 333, 345/335, 339, 340, 343, 344, 346, 347

[56] References Cited

U.S. PATENT DOCUMENTS

| | | | |
|---|---|---|---|
| 5,412,776 | 5/1995 | Bloomfield et al. | 395/346 |
| 5,425,141 | 6/1995 | Gedye | 395/340 |
| 5,438,661 | 8/1995 | Ogawa | 395/346 |
| 5,491,795 | 2/1996 | Beaudet et al. | 395/346 |
| 5,544,299 | 8/1996 | Wenstrand et al. | 395/345 |

OTHER PUBLICATIONS

*Mastering Windows 3.1*, Cowart, SYBEX Inc., Alameda, CA., 1993 pp. 62–64.

Primary Examiner—Raymond J. Bayerl
Assistant Examiner—Steven P. Sax
Attorney, Agent, or Firm—Mark S. Walker; Antony P. Ng; Andrew J. Dillon

[57] ABSTRACT

A method and apparatus are disclosed that allow rapid positioning of a cursor within a data processing system graphical user interface. The method involves establishing a preferred order of the cursor movement between at least a subset of windows with all windows active on the data processing system and then repositioning the cursor based upon the preferred order of the cursor movement between the windows when an input stimulus is activated. Next, the window is then activated based on the cursor being repositioned and then giving the activated window the focus within the graphical user interface, which then leads to the activated window being prepared for date manipulation. The apparatus comprises a keyboard coupled to the data processing system, a pointer device, also coupled to the data processing system, and means for establishing a user definable window application order preference queue. The preference queue allows a user to select another application from the queue by activating a selected key on the keyboard, typically the Alt_Tab key.

12 Claims, 7 Drawing Sheets

METHOD AND APPARATUS FOR PROVIDING PROGRAMMABLE WINDOW-TO-WINDOW FOCUS CHANGE WITHIN A DATA PROCESSING SYSTEM USING A GRAPHICAL USER INTERFACE

This is a continuation of application Ser. No. 08/571,320, filed Dec. 12, 1995, now abandoned.

TECHNICAL FIELD

The present invention relates in general to a method and system for data processing and, in particular, to a method and system of user interface for the data processing system. Still, more particularly, the present invention relates to a method and system for user programmable input focus shifting within a data processing system by providing a window focus queue of desired applications.

DESCRIPTION OF RELATED ART

Within data processing systems, user interface is accomplished in a variety of ways. An increasingly common type of user interface is a graphical user interface (GUI), which provides a user with a graphical and intuitive display of information. Typically, the user interacts with a GUI display with a graphical pointer, which a user controls utilizing a graphical pointing device, such as a mouse, trackball, or joystick. Additionally, the user can interact with the GUI display using the keyboard by selecting a particular key or combination of keys that have been preprogrammed to perform a particular operation. These operations may include, for example, opening an application, closing an application, deleting a file, or exiting out of the system entirely. Additionally, the keyboard can provide certain functions that are not possible with a graphical pointing device. These functions typically include locating hidden files or opened applications without closing other applications.

Typically, in a Windows-based environment, either under Open Systems Foundation Motif or a Windows program provided by Microsoft, a user can scan through all active windows using the combination of the Alt-Tab keys. Unfortunately, the window focus manipulation provided by the Alt-Tab sequence of keys provided in the prior art is limited to forcing the user to file through all active applications in a sequential order. This sequencing includes identifying those applications that have been iconified, which typically means the user was not interested in having them active at the time.

Accordingly, what is needed is a windows focus selection mechanism that avoids the restrictions of the prior art in limiting a user to either a round-robin or back and forth movement amongst windows. In particular, what is needed is a windows focus activation mechanism that allows a user to avoid even trivial windows that are not active at the time and are of no particular use or of interest to the user at the time the user desires to swap active focus or select a particular window for active focus amongst a group from which the user wishes to select.

SUMMARY OF THE INVENTION

It is one object of the present invention to provide a method and system for data processing.

It is another object of the present invention to provide a method and system of user interface for the data processing system.

It is yet another object of the present invention to provide a method and system for user programmable input focus shifting within a data processing system by providing a window focus queue of desired applications.

According to the present invention, a method and apparatus are disclosed that allow rapid positioning of a cursor within a data processing system graphical user interface. The method involves establishing a preferred order of the cursor movement between at least a subset of windows with all windows active on the data processing system and then repositioning the cursor based upon the preferred order of the cursor movement between the windows when an input stimulus is activated. Next, the window is then activated based on the cursor being repositioned and then giving the activated window the focus within the graphical user interface, which then leads to the activated window being prepared for date manipulation. The apparatus comprises a keyboard coupled to the data processing system, a pointer device, also coupled to the data processing system, and means for establishing a user definable window application order preference queue. The preference queue allows a user to select another application from the queue by activating a selected key on the keyboard, typically the Alt_Tab key.

In the method, the establishing of the preferred order is accomplished by first generating a table window preference queue for the subset of windows and then selecting a window for placement in the table window preference queue. This is done by manipulating the cursor to first establish the preference queue and then secondly add any active windows to that queue in a preferred order of the user. Further, the activating step selects a desired window from the table window preference queue where the selecting step allows the user to either cycle through the queue until such a desired window has the input focus, whether this is in a sequential or reverse sequential order based on the placement order of the subset of windows to the queue.

The apparatus further includes means for associating the user selected applications in the preference queue with the pointing device, thereby allowing the user to determine the order of the applications placed in the queue and means for cycling through the window application order preference queue according to a user's order determination for selecting the desired application. Again, if a sequential order is desired by the user, the user activates the Alt_Tab key while if the user desires to use a reverse sequential order, the user selects the Alt_Shift_Tab key.

The above as well as additional objects, features, and advantages of the present invention will become apparent in the following detailed written description.

DETAILED DESCRIPTION OF PREFERRED EMBODIMENT

Figure 1:
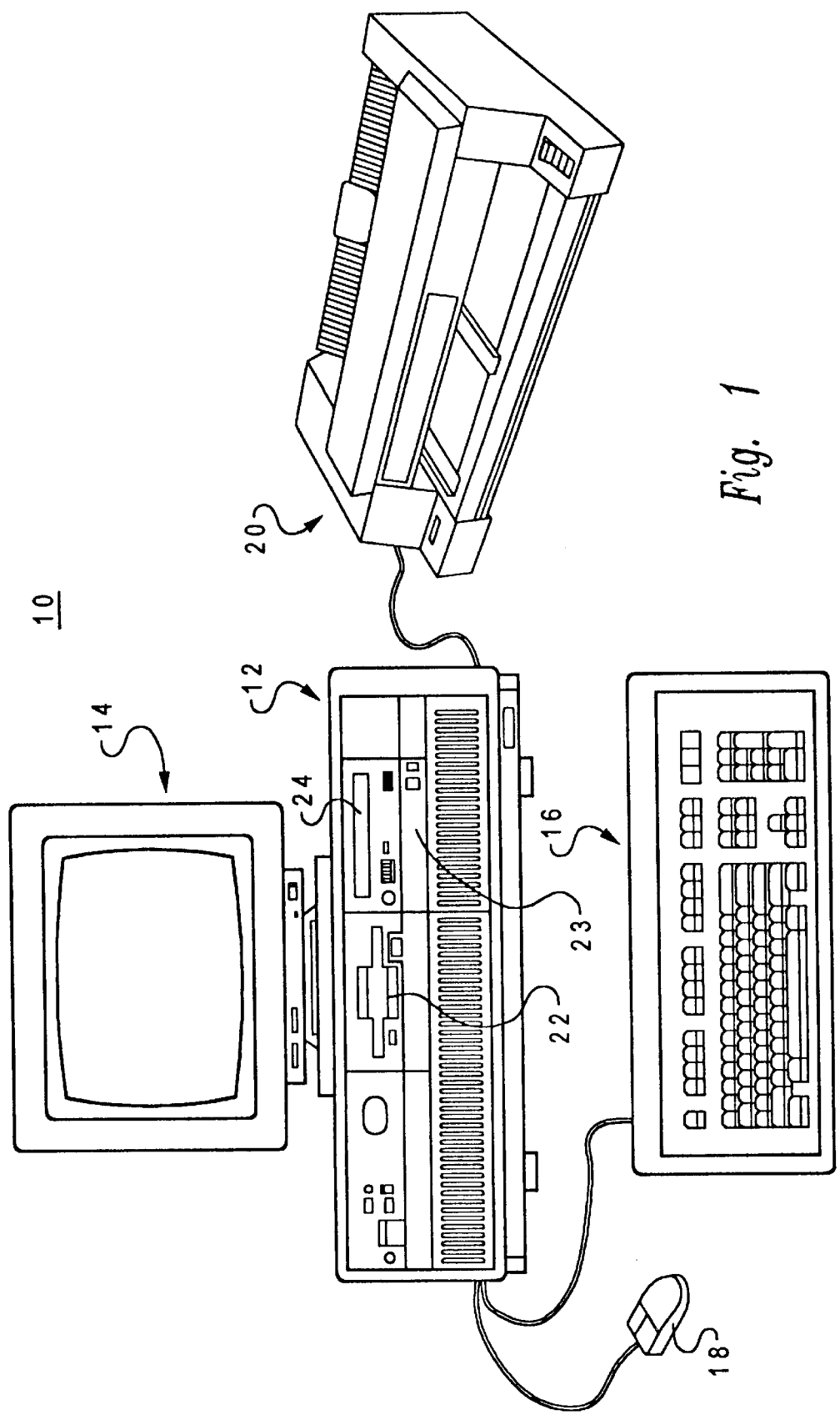
FIG. 1 is a pictorial representation of a data processing system which may be utilized to implement the method and system of the present invention.

With reference now to the figures and in particular with reference to FIG. 1, there is illustrated a preferred embodiment of a data processing system which may be utilized to implement the method of the present invention. As illustrated, data processing system 10 includes system unit 12, display device 14, keyboard 16, mouse 18, and printer 20. As is well-known in the art, system unit 12 receives data for processing from input devices such as keyboard 16, mouse 18, or local area networking interfaces (not illustrated). Mouse 18 is preferably utilized in conjunction with a graphical user interface (GUI) in which hardware and software system objects, including data processing system components and application programs, are controlled through the selection and manipulation of associated graphical objects displayed within display device 14. Although data processing system 10 is illustrated with mouse 18, those skilled in the art will recognize that other graphical pointing devices, including a graphics tablet, stylus, light pen, joystick, puck, trackball, trackpad, and the IBM TrackPoint™ can also be utilized. Data processing system 10 presents output data to a user via display device 14 and printer 20. To support storage and retrieval of data, system unit 12 further includes diskette drive 22, hard disk drive 23, and CD-ROM drive 24, which are connected to system unit 12 in a well-known manner. Of course, those skilled in the art are aware that other conventional components can also be connected to system unit 12.

Figure 2:
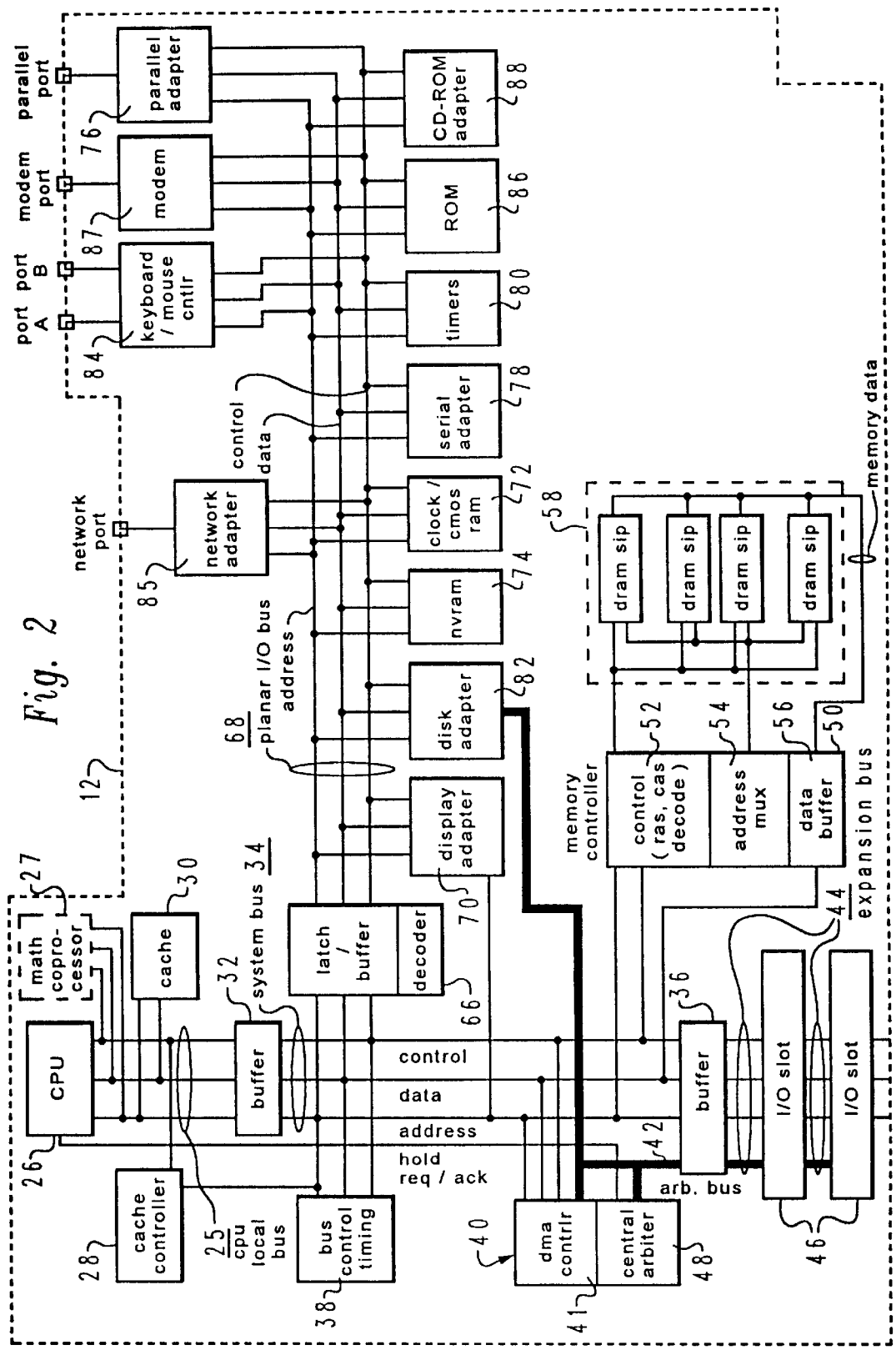
FIG. 2 depicts a block diagram of the system unit of the data processing system illustrated in FIG. 1.

Referring now to FIG. 2, there is depicted a block diagram of the principal components of system unit 12 of data processing system 10. As illustrated, system unit 12 includes a central processing unit (CPU) 26 which executes software instructions. While any appropriate microprocessor can be utilized for CPU 26, CPU 26 is preferably one of the PowerPC™ line of microprocessors available from IBM Microelectronics. Alternatively, CPU 26 can be implemented as one of the 80X86 microprocessors, which are available from a number of vendors. In addition to CPU 26, an optional math coprocessor 27, cache controller 28, and cache memory 30 are coupled to high-speed CPU local bus 25. Math coprocessor 27 is an optional processor, distinct from CPU 26, that performs mathematic computations with greater efficiency than CPU 26. Math coprocessor 27 is optional since the performance advantage provided by a math coprocessor may be achieved by enhancements to CPU 26, such as the implementation of multiple floating-point execution units. Cache memory 30 comprises a small high-speed memory which stores frequently accessed data and instructions. The operation of cache 30 is controlled by cache controller 28, which maintains a directory of the contents of cache 30 and enforces a selected cache coherency protocol.

CPU local bus 25 is coupled to buffer 32 to provide communication between CPU local bus 25 and system bus 34, which extends between buffer 32 and a further buffer 36. System bus 34 is connected to bus control and timing unit 38 and direct memory access (DMA) unit 40, comprising central arbiter 48 and DMA controller 41. DMA controller 41 supports memory accesses that do not involve CPU 26. Direct memory accesses are typically employed to transfer data directly between RAM 58 and an "intelligent" peripheral device, such as disk adapter 82. DMA requests from multiple peripheral devices are arbitrated by central arbiter 48. As described below, central arbiter 48 also regulates access to devices coupled to expansion bus 44 by control signals transmitted via arbitration control bus 42.

CPU 26 accesses data and instructions from and stores data to volatile random access memory (RAM) 58 through memory controller 50, which comprises memory control unit 50, address multiplexer 54, and data buffer 56. Memory control unit 52 generates read enable and write enable signals to facilitate storage and retrieval of data and includes address translation facilities that map virtual addresses utilized by CPU 26 into physical addresses within RAM 58. As will be appreciated by those skilled in the art, RAM 58 comprises a number of individual volatile memory modules which store segments of operating system and application software while power is supplied to data processing system 10. The software segments are partitioned into one or more virtual memory pages which each contain a uniform number of virtual memory addresses. When the execution of software requires more pages of virtual memory that can be stored within RAM 58, pages that are not currently needed are swapped with the required pages, which are stored within nonvolatile storage devices 22–24.

Memory controller 50 further includes address multiplexer 54, which selects particular addresses within RAM 58, and data buffer 56, which buffers data read from and stored to RAM 58. Memory controller 50 also provides memory protection that isolates system processes and user processes within the virtual address space allocated to each process. Thus, a program running in user mode can access only memory allocated to its virtual address space; the user mode program cannot access memory within another process's virtual address space unless memory sharing between the processes is supported and the program has the appropriate privileges for the access.

Still referring to FIG. 2, buffer 36 provides an interface between system bus 34 and expansion bus 44. Connected to expansion bus 44 are a number of I/O slots 46 for receiving adapter cards which may be further connected to an I/O device or memory. Arbitration control bus 42 couples DMA controller 41 and central arbiter 48 to I/O slots 46 and disk adapter 82. By implementing a bus arbitration protocol, central arbiter 48 regulates access to expansion bus 44 by extension cards, controllers, and CPU 26. In addition, central arbiter 48 arbitrates for ownership of expansion bus 44 among the bus masters coupled to expansion bus 44. Bus master support allows multiprocessor configurations of expansion bus 44 to be created by the addition of bus master adapters containing a processor and its support chips.

System bus 34 is coupled to planar I/O bus 68 through buffer 66. Attached to planar I/O bus 68 are a variety of I/O adapters and other peripheral components, including display adapter 70, disk adapter 82, nonvolatile RAM 74, clock 72, serial adapter 78, timers 80, read only memory (ROM) 86, CD-ROM adapter 88, keyboard/mouse controller 84, network adapter 85, modem 87, and parallel adapter 76. Display adapter 70 translates graphics data from CPU 26 into R, G, and B video signals utilized to drive display device 14. Depending upon the operating system and application software running, the visual output may include text, graphics, animation, and multimedia video. Disk adapter 82 controls the storage of data to and the retrieval of data from hard disk drive 24 and diskette drive 22. Disk adapter 82 handles tasks such as positioning the read/write heads within drives 22 and 23 and mediating between drives 22 and 23 and CPU 26. Nonvolatile RAM 74 stores system configuration data that describes the present configuration of data processing system 10. For example, nonvolatile RAM 74 contains information that describes the capacity of hard disk drive 24 or a diskette placed within diskette drive 22, the type of display device 14, the amount of free RAM 58, and the present system configuration. These data remain stored in nonvolatile RAM 74 when power is removed from data processing system 10.

Clock 72 is utilized by application programs executed by CPU 26 for time of day calculations. Serial adapter 78 provides a synchronous or asynchronous serial interface which enables data processing system 10 to communicate with a remote data processing system or peripheral device. Serial communication is governed by a serial communication protocol such as RS-232, RS-422, or the like. Timers 80 comprise multiple interval timers which may be utilized by application or operating system software to time one or more selected events within data processing system 10.

ROM 86 typically stores a basic input/output system (BIOS) which provides user-transparent I/O when CPU 26 is operating under the DOS operating system. BIOS also includes power on self-test (POST) diagnostic routines which perform system set up at power on. For example, POST interrogates hardware, allocates a BIOS data area (BDA), constructs an interrupt vector table to point to interrupt handling routines within ROM 86, and initializes timers 80, clock 72 and other devices within system unit 12. CD-ROM adapter 88 interfaces CD-ROM drive 24 with planar I/O bus 34 to support retrieval of data from an optical disk loaded within CD-ROM drive 24. Keyboard/mouse controller 84 interfaces system unit 12 with keyboard 16 and a graphical pointing device such as mouse 18. As will be described in greater detail below, keyboard/mouse controller 84 receives a serial signal from mouse 18 that indicates each incremental displacement of mouse 18.

Finally, system unit 12 includes network adapter 85, modem 87, and parallel adapter 76, which facilitate communication between data processing system 10 and peripheral devices or other data processing systems. Network adapter 85 is utilized to connect data processing system 10 to an unillustrated local area network (LAN). A LAN provides a user of data processing system 10 with a means of electronically communicating information, including software, with a remote computer or a network logical storage device. Additionally, LAN supports distributed processing, which enables data processing system 10 to share a task with other data processing systems linked to the LAN. Modem 87 supports communication between data processing system 10 and another data processing system over a standard telephone line. For example, modem 87 may be utilized to connect data processing system 10 to an on-line information service, such as the information service provided by Prodigy Services Corporation under the service mark "PRODIGY." Such on-line service providers frequently offer software that can be downloaded into data processing system 10 via modem 87. Furthermore, through modem 87, data processing system 10 can access other sources of software, such as a server, an electronic bulletin board, and the Internet or World Wide Web. Parallel port 76 transmits printer control signals and output data to printer 20 through a parallel port.

As is typical of many data processing systems, following power-on, the various hardware components of data processing system 10 will each execute its own internal reset procedures to regain a stable, known state. At the completion of these reset procedures, CPU 26 will execute POST code within ROM 86 to initialize system hardware, setup the BIOS data area, and construct and interrupt vector table, as well as other tasks. Following POST, a "boot strap" or primary operating system loader is run to load segments of an operating system (OS) 100 (see FIG. 3) into RAM 58 and launch execution of OS 100, which in a preferred embodiment of the present invention comprises OS/2 Warp, available from IBM Corporation.

Figure 3:
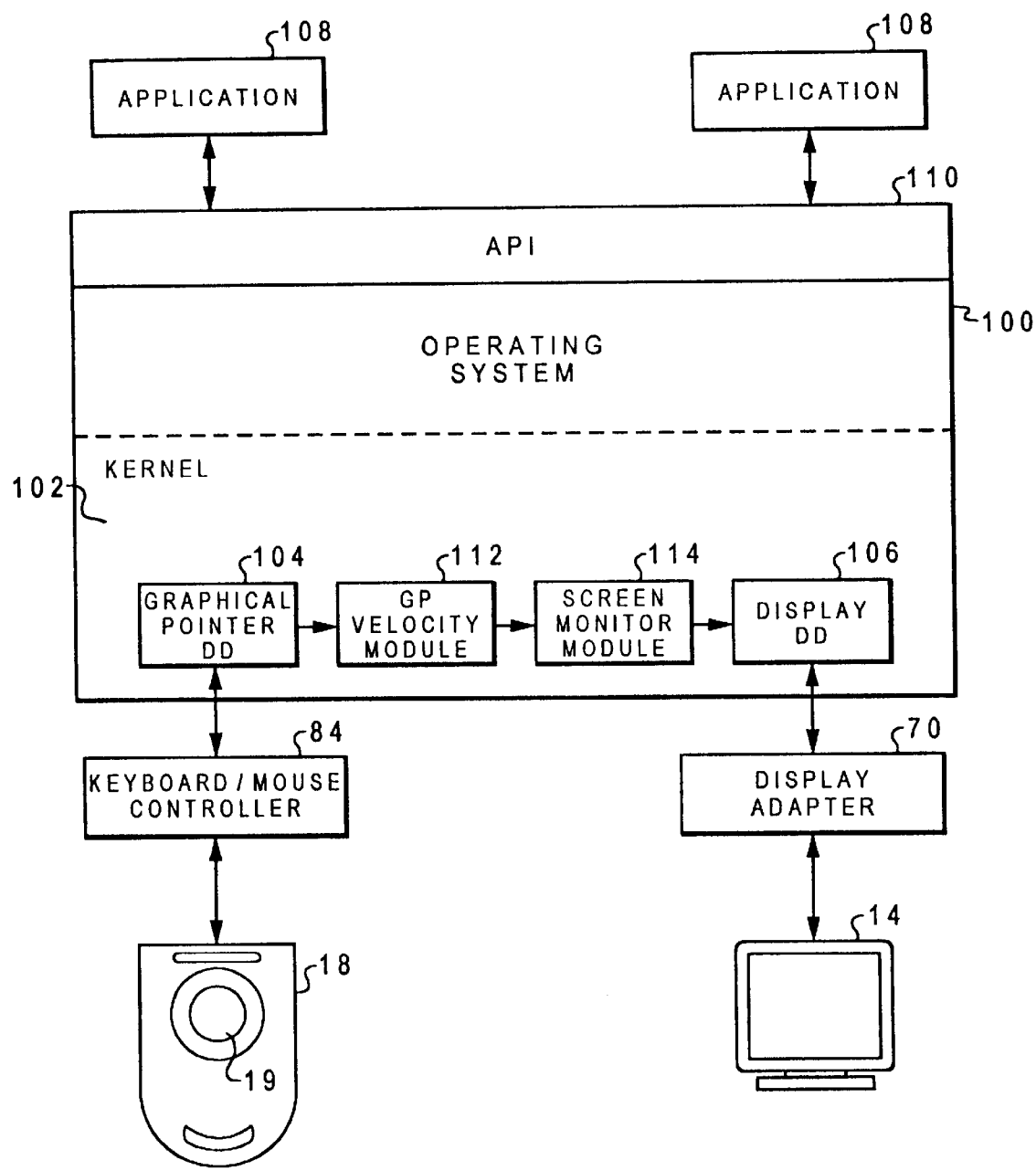
FIG. 3 illustrates a conceptual diagram of the interaction between a graphical pointing device, the software configuration utilized by the present invention, and a display device.

With reference now to FIG. 3, there is illustrated a pictorial representation of the software configuration of data processing system 10 following power-on. As depicted, the software configuration of data processing system 10 comprises OS 100, which includes kernel 102, and one or more applications 108, which communicate with OS 100 through Application Programming Interface (API) 110. Kernel 102 comprises the lowest level of OS 100 that controls the operation of the hardware components of data processing system 10 through device drivers, such as graphical pointer device driver 104 and display device driver 106.

As illustrated, graphical pointer device driver 104 and display device driver 106 communicate with keyboard/mouse controller 84 and display adapter 70, respectively, to support the interconnection of mouse 18 (illustrated in a bottom view) and display device 14 with data processing system 10. In response to movement of trackball 19 of mouse 18, mouse 18 transmits an analog graphical pointer signal to keyboard/mouse controller 84 that describes the direction and rotation of trackball 19. Keyboard/mouse controller 84 digitizes the analog graphical pointer signal and transmits the digitized graphical pointer signal to graphical pointer device driver 104, which thereafter interprets the digitized graphical pointer signal and routes the interpreted graphical pointer signal to graphical pointer velocity module 112 within kernel 102. Graphical pointer velocity module 112 modifies the interpreted graphical pointer signal to retard or accelerate the rate of movement of the graphical pointer manipulated utilizing mouse 18. Graphical pointer velocity module then passes the modified and interpreted graphical pointer signal to screen monitor module 114, which performs GUI actions based on the position of the graphical pointer within display device 14. For example, screen monitor module 114 causes a window to surface within a GUI in response to a user selection of a location within the window. In addition, according to present invention, screen monitor module 114 selectively controls the traversal rate of the graphical pointer when the graphical pointer is positioned within a widget displayed within display device 14. Finally, the graphical pointer signal is passed to display device driver 106, which routes the data within the graphical pointer signal and other display data to display adapter 70, which translates the display data into the R, G, and B signals utilized to drive display device 14. Thus, the movement of trackball 19 of mouse 18 results in a corresponding movement of the graphical pointer displayed within display device 14.

Figure 4:
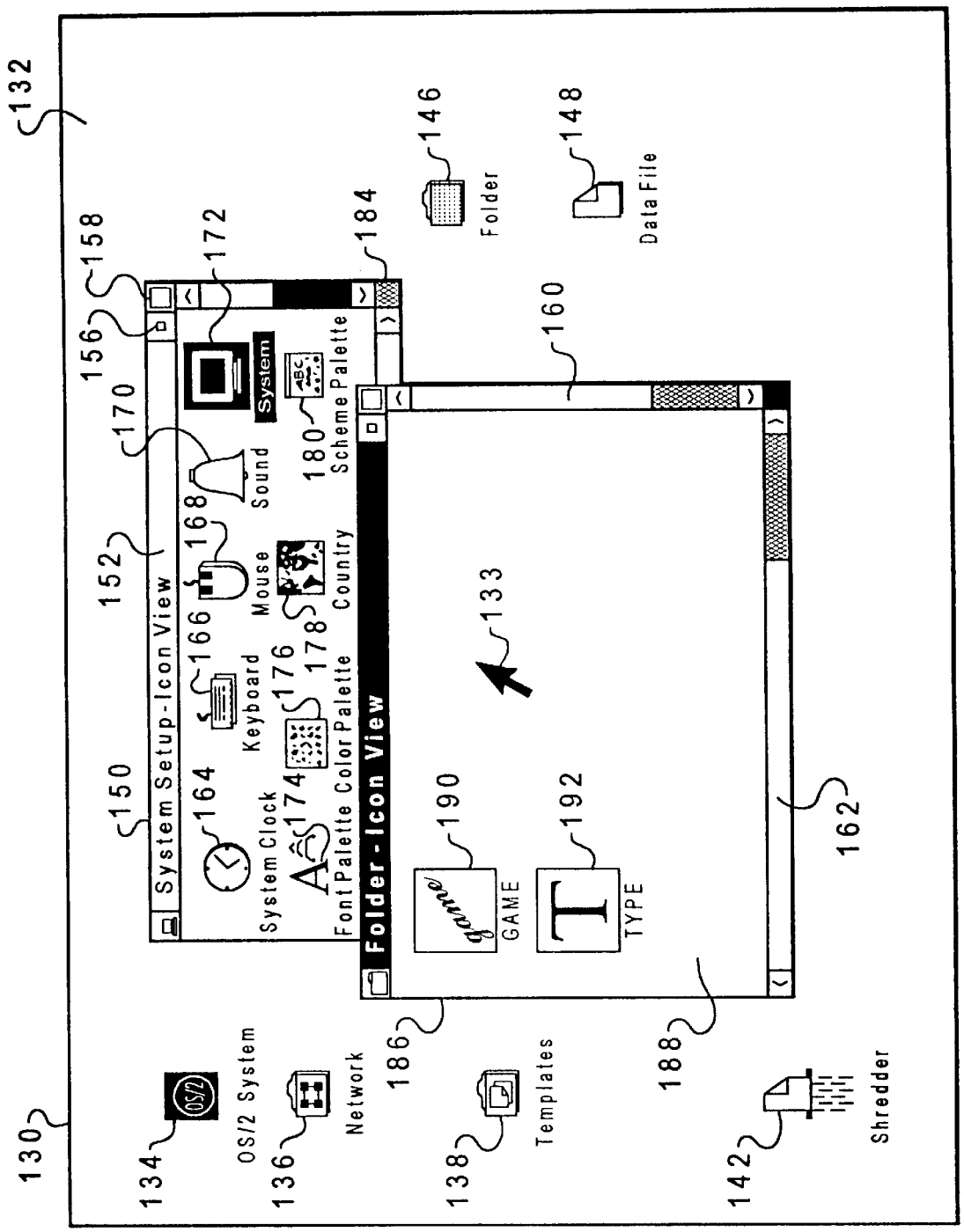
FIG. 4 depicts a pictorial representation of a desktop displayed within the display device of the data processing system illustrated in FIG. 1.

Referring now to FIG. 4, there is depicted a preferred embodiment of the graphical user interface (GUI) employed by OS 100. Screen 130 displayed to a user within display device 14 includes a background desktop 132 upon which a plurality of user-selectable icons 134–148 are displayed. Each icon 134–148 represents an program, function, or file storage area, which a user can conveniently select utilizing graphical pointer 133 by double-clicking the left button of mouse 18. When a user selects one of icons 134–148, the function corresponding to the selected icon is activated and the selected icon is highlighted. Many of icons 134–148 have an associated window or series of windows that are displayed when the icon is selected. For example, when OS/2 System icon 134 is selected, window 150 is displayed to the user to provide further possible selections (i.e., icons 164–180). In the depicted example, folder icon 146 has also been selected. Accordingly, folder window 186, which contains GAME icon 190 and TYPE icon 192, is also displayed to the user on desktop 132. Windows 150 and 186 include a title bar 152, which identifies the contents of each window, and shrink and grow buttons 142 and 144, which are utilized to minimize (close) or maximize (set to full screen size) each of windows 150 and 186. Each of windows 150 and 186 also provides vertical and horizontal scroll bars 160 and 162, respectively, to enable a user to scroll through the contents of the corresponding window and a display area 188, upon which a plurality of icons can be displayed. Finally, windows 150 and 186 include resizing box 184, which enables a user to resize the associated one of windows 150 or 186 utilizing the familiar drag-and-drop technique. According to the present invention, each of the hereinbefore described graphical features of the GUI depicted in FIG. 4, including desktop icons 134–148, windows 150 and 186, display areas 188, scroll bars 160 and 162, etc., can be defined as a widget, thereby enabling the traversal rate of graphical pointer 133 within each of these graphical features to be individually controlled.

Figure 5:
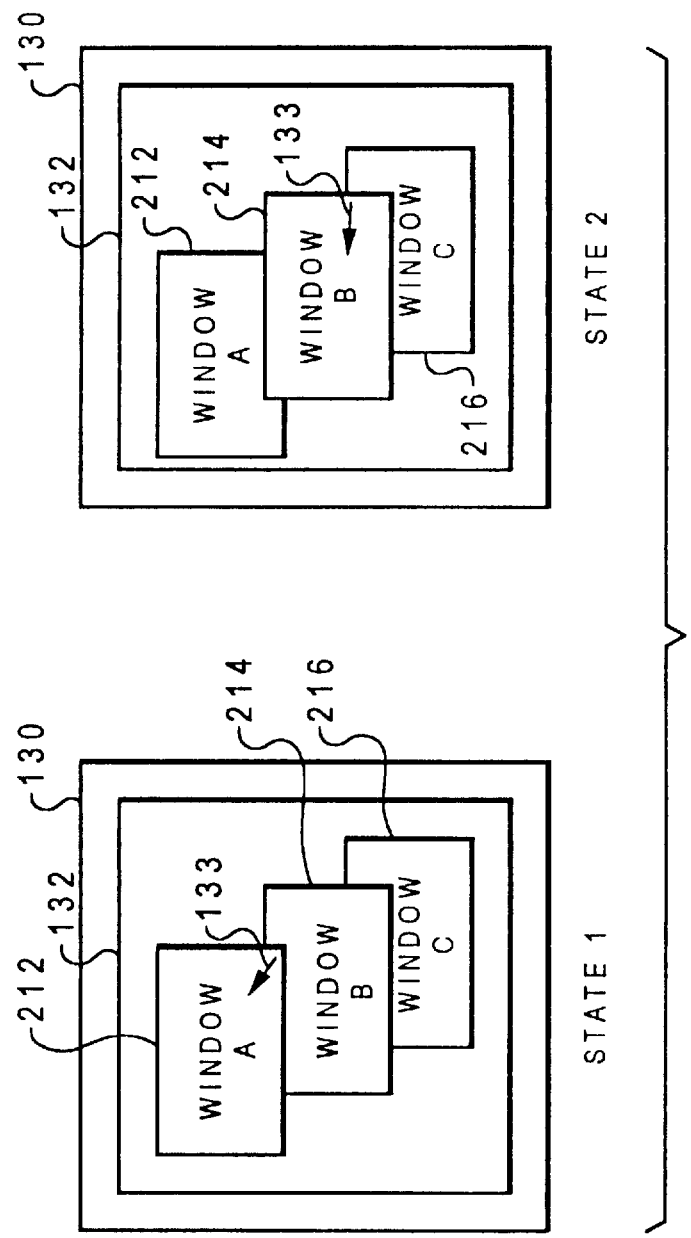
FIG. 5 depicts a screen with a set of typical windows similar to that in FIG. 4.

FIG. 5 depicts a screen with a set of typical windows similar to that in FIG. 4. A first window 212, also identified as Window A in the FIG. 5, is in the forefront, being the current window of interest to the user. Any of the remaining windows 214, 216, also known as Window B and Window C, respectively, can be brought into focus by positioning the pointing device 133 and clicking on that window, or by using the Alt-Tab key to bring the windows into focus in an order determined by the operating system, or in the reverse of that order by using the Alt-Shift-Tab key. The movement of pointer device 133 from window 212 to window 214 via the process depicted in FIG. 3 causes a significant visible change in the appearance of the screen. Window 214 has been made to appear to be in the forefront of window 212. This effect can also be caused by using the keyboard via the Alt-Tab key, or any key thus programmed. The user, however, would first have to visit window 216, due to the random order of preference assigned by the operating system. Furthermore, the user cannot exclude Window C from the sequence of focused windows in the prior art.

It is also understood by those skilled in the art that even though the positioning of the pointer to these window objects is a very frequent action taken by a user, there is no way for the user to dictate the exact order of window focusing except move the mouse pointer for each desired sequential operation. Unless the operating system-defaulted order of position happens to coincide with the desires of the user, the keyboard input, although much quicker and easier for the user, will not work. Furthermore, the keyboard selection brings to focus all windows on the screen, including even those that have been iconized, resulting in unnecessary and time-wasting operations for the user. Thus, there is provided a way for a user to position between a chosen subset of windows on a display screen by using the keyboard as a quick-shifting mechanism instead of the more tedious method of rolling and positioning the mouse pointer.

Figure 6:
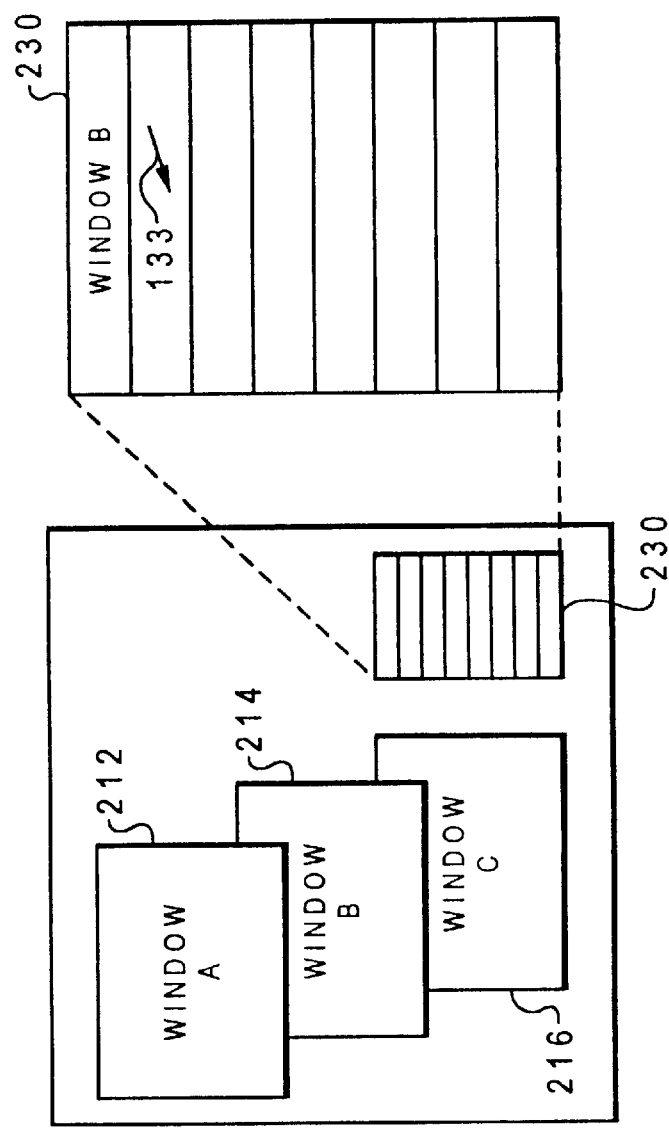
FIG. 6 is a depiction of a preferred entry in the Table of Windows Order Preference queue.

To create the chosen subset of window order preference, the user clicks on a window to be included in the subset and then clicks on the preferred entry in the Table of Windows Order Preference queue 230 depicted in FIG. 6. The Table of Window Order Preference queue 230 lists the subset of windows to be scrolled through using the Tab-Alt key. In this particular case, window 214 has already been selected and window 212 is about to be selected. Window 216 has not been selected and will be excluded from Table of Window Order Preference queue 230.

In actual implementation, a user clicks within a line 232 in the queue 230 and a system-recognized value for Window A will be inserted in queue 230 at the location selected by the mouse pointer 133. In this example, Window A is selected because it is the raised window, or window in focus. Note that the user could include the same window more than once in the table. Further, although queue 230 shows only eight lines, the implementation is not duly limited to eight lines, but the user may have, for example, less than eight lines or more than eight lines.

Figure 7:
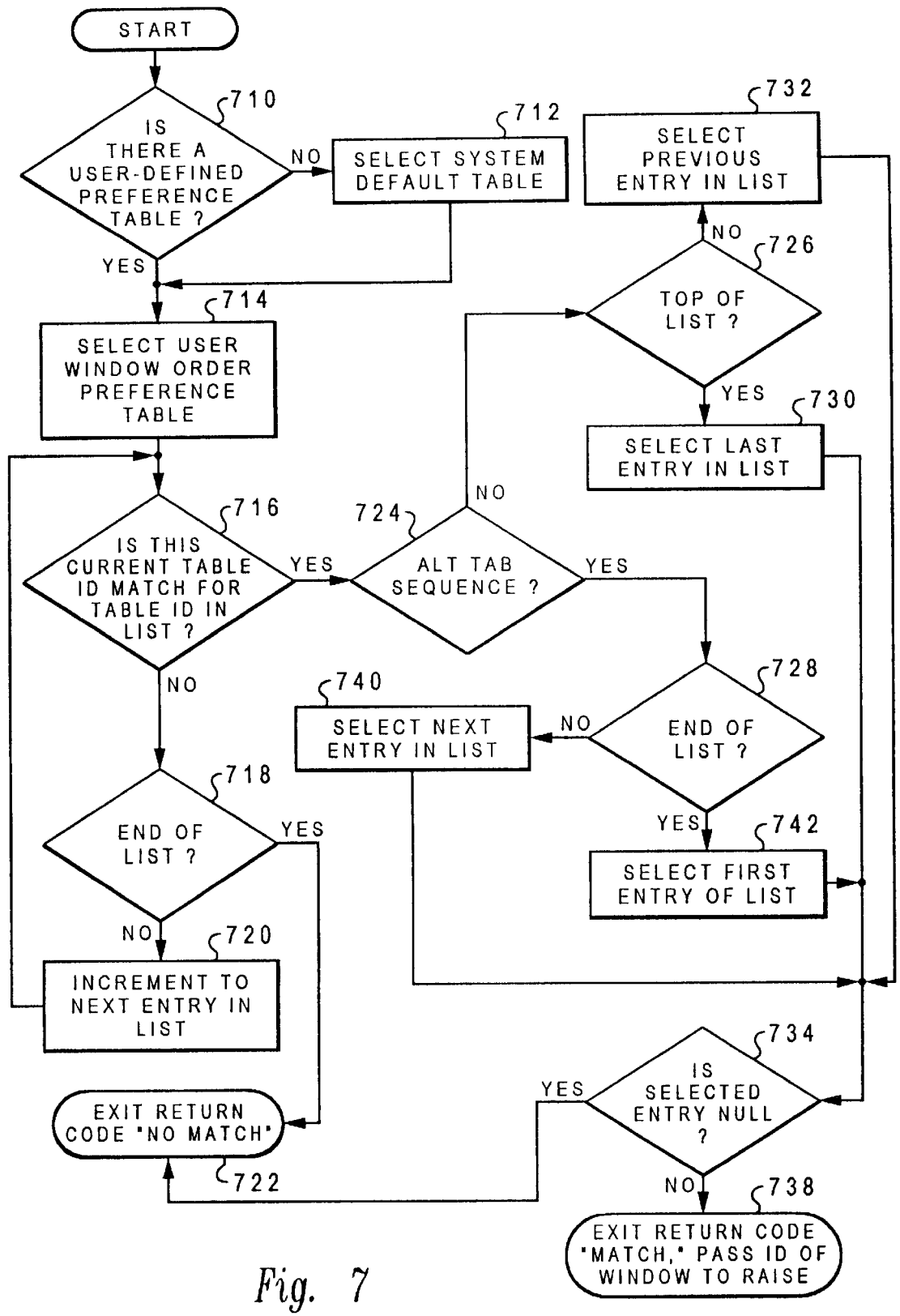
FIG. 7 depicts a block diagram showing the logic of the queue program module according to the present invention.

To carry out the table of window order preference, a new program module is added to FIG. 3. This program module can be a modification to the keyboard interpretation module, depicted in FIG. 1 alternatively. The program module checks for a Table of Window Order Preference queue 230, which is set by the user before checking for the operating system default window or preference. FIG. 7 depicts a block diagram showing the logic of the new program module.

After the start, the module, in block 710, first determines if there is a user-defined preference table. If not, the module proceeds to block 712 where the module selects the system default table and then proceeds to block 714. If there is a user-defined preference table, the module proceeds to block 714 where the module selects the user window order preference table. Next, the module proceeds to block 716 where the module determines whether the current table ID matches with the table ID in the list. If the match does occur, the system proceeds to block 724; otherwise, the system proceeds to block 718.

In block 718, the module determines if an end-of-list event has occurred and if not proceeds to block 720; otherwise the module proceeds to block 722. In block 720, the module increments to the next entry in the list and then returns back to block 716. In block 722, the module exits and returns a message of no match, and then the module is finished.

In block 724, the module determines whether the Alt-Tab sequence has been selected and if not proceeds to block 726. If the Alt-Tab sequence has been selected, the module proceeds to block 728 where the module determines whether the end of the list has been reached. In block 726, the module determines whether the top of the list has been selected and if so proceeds to block 730. Otherwise, the module proceeds to block 732. In block 730, the module selects the last entry in the list and then proceeds to block 734. In block 730, the module selects the previous entry in the list and then proceeds to block 734. In block 734, the module determines if the selected entry is null and if so proceeds to block 722; otherwise, the system then proceeds to block 738 and exits the module and returns a code of "match" and passes the ID of the window to be raised.

In block 728, the module determines if the end of list has been reached and if not proceeds to block 740. Otherwise, the system proceeds to block 742 where the module selects the first entry in the list and then proceeds to 734. In block 740, the module selects the next entry in the list and then proceeds to block 734.

The program module steps depicted in FIG. 7 may also be incorporated in the screen monitor module of FIG. 3 or can be a dedicated module invoked by the other software modules. In the preferred embodiment, it would be an independent module callable by other program modules.

The sole function of this window preference module is to determine if the user has created a table window order preference. If the user has created his own table window order preference, the module selects the next window to bring into focus by finding the identity of the current window in focus and selecting the next entry. In the preferred embodiment, both the Alt-Tab sequence and the Alt-Shift-Tab keyboard sequences are recognized. When the Alt-Tab sequence is detected, the next entry will be the entry after the window currently in focus. When the Alt-Shift-Tab sequence is detected, the next entry becomes the entry before the window currently in focus. For either keyboard sequence, the window preference module is sensitive to the limits of the list and will wrap to the appropriate entry if top or bottom of the list is detected.

As described above, aspects of the present invention pertain to specific "method steps" implementable on computer systems. In an alternate embodiment, the invention may be implemented as a computer program product for use with a computer system. Those skilled in the art should readily appreciate that programs defining the functions of the present invention can be delivered to a computer in many forms, which include, but are not limited to: (a) information permanently stored on non-writable storage media (e.g. read only memory devices within a computer such as ROM 86 or optical disks readable by CD-ROM drive 24); (b) information alterably stored on writable storage media (e.g., floppy disks within diskette drive 22 or hard disk drive 24); or (c) information conveyed to a computer through communication media, such as through a computer or telephone network. It should be understood, therefore, that such media, when carrying computer readable instructions that direct the method functions of the present invention, represent alternate embodiments of the present invention.

While the invention has been particularly shown and described with reference to a preferred embodiment, it will be understood by those skilled in the art that various changes in form and detail may be made therein without departing from the spirit and scope of the invention.

What is claimed is:

1. A method for bringing a window into focus on a graphical user interface having a plurality of windows being displayed on a graphics monitor screen within a data processing system, wherein said plurality of windows includes a user selected set of active windows and a set of inactive windows, wherein said data processing system includes a keyboard as an input device, said method comprising the steps of:

adding a window-order-preference queue to said graphical user interface, wherein said window-order-preference queue includes a plurality of user selected active window entries;

inserting each of said plurality of entries with an active window name chosen from said set of active windows by a user, wherein the order of said insertion of each of said active window names is established according to said user's expressed preference;

bringing a window corresponding to one of said plurality of entries within said window-order-preference queue into focus on said graphical user interface in response to an input stimulus by said user via said keyboard; and preparing said focused window for data manipulation.

2. The method for bringing a window into focus on a graphical user interface according to claim 1, wherein said input stimulus further includes a step of toggling a combination of keys on said keyboard.

3. The method for bringing a window into focus on a graphical user interface according to claim 1, wherein said method further includes a step of cycling through each of said plurality of entries until a desired window is chosen by said user.

4. The method for bringing a window into focus on a graphical user interface according to claim 3, wherein said cycling step is either in a forward sequential order or a reverse sequential order.

5. A computer program product residing on a computer-usable medium for bringing a window into focus on a graphical user interface having a plurality of windows being displayed on a graphics monitor screen within a data processing system, wherein said plurality of windows includes a user selected set of active windows and a set of inactive windows, wherein said data processing system includes a keyboard as an input device, said computer program product comprising:

program code means for adding a window-order-preference queue to said graphical user interface, wherein said window-order-preference queue includes a plurality of user selected active window entries;

program code means for inserting each of said plurality of entries with an active window name chosen from said set of active windows by a user, wherein the order of said insertion of each of said active window names is established according to said user's expressed preference;

program code means for bringing a window corresponding to one of said plurality of entries within said window-order-preference queue into focus on said graphical user interface in response to an input stimulus by said user via said keyboard; and program code means for preparing said focused window for data manipulation.

6. The computer program product means for bringing a window into focus on a graphical user interface according to claim 5, wherein said input stimulus further includes toggling of a combination of keys on said keyboard.

7. The computer program product residing on a computer-usable medium for bringing a window into focus on a graphical user interface according to claim 6, wherein said method further includes a product code means for cycling through each of said plurality of entries until a desired window is chosen by said user.

8. The computer program product residing on a computer-usable medium for bringing a window into focus on a graphical user interface according to claim 7, wherein said product code means for cycling causes said cycling in a forward sequential order or in a reverse sequential order.

9. An apparatus for bringing a window into focus on a graphical user interface having a plurality of windows being displayed on a graphics monitor screen within a data processing system, wherein said plurality of windows includes a user selected set of active windows and a set of inactive windows,] wherein said data processing system includes a keyboard as an input device, said apparatus comprising:

means for adding a window-order-preference queue to said graphical user interface, wherein said window-order-preference queue includes a plurality of user selected active window entries;

means for inserting each of said plurality of entries with an active window name chosen from said set of active windows by a user, wherein the order of said insertion of each of said active window name is established according to said user's expressed preference;

means for bringing a window corresponding to one of said plurality of entries within said window-order-preference queue into focus on said graphical user interface in response to an input stimulus by said user via said keyboard; and means for preparing said focused window for data manipulation.

10. The apparatus for bringing a window into focus on a graphical user interface according to claim 9, wherein said input stimulus further includes toggling of a combination of keys on said keyboard.

11. The apparatus for bringing a window into focus on a graphical user interface according to claim 9, wherein said apparatus further includes a means for cycling through each of said plurality of entries until a desired window is chosen by said user.

12. The apparatus bringing a window into focus on a graphical user interface according to claim 11, wherein said cycling means causes a cycling in a forward sequential order or in a reverse sequential order.

* * * * *